(12) United States Patent
Kim

(10) Patent No.: US 6,377,275 B1
(45) Date of Patent: Apr. 23, 2002

(54) METHOD AND APPARATUS FOR OUTPUTTING AN ON-SCREEN DISPLAY OF A DISPLAY DEVICE

(75) Inventor: Jung-Dae Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/299,585

(22) Filed: Apr. 27, 1999

(30) Foreign Application Priority Data

Nov. 30, 1998 (KR) .............................. 98/52071
Apr. 19, 1999 (KR) .............................. 98/15005

(51) Int. Cl.[7] .................................. G09G 5/00
(52) U.S. Cl. ...................... 345/618; 345/719; 345/213
(58) Field of Search ............................... 345/112, 117, 345/141, 211, 339, 347, 121, 213, 618, 719, 771, 867; 713/310, 320; 348/569, 589, 503

(56) References Cited

U.S. PATENT DOCUMENTS

| 5,712,690 A | * | 1/1998 | Kim ........................... 348/570 |
| 5,736,873 A | * | 4/1998 | Hwang ........................ 327/41 |
| 5,956,022 A | * | 9/1999 | Cheng ......................... 345/213 |
| 6,085,326 A | * | 7/2000 | Kim ........................... 713/300 |

FOREIGN PATENT DOCUMENTS

| JP | 07295531 A | * | 11/1995 | ............ G09G/5/00 |
| JP | 08016121 A | * | 1/1996 | ............ G09G/1/00 |
| JP | 08149405 A | * | 6/1996 | .......... H04N/5/765 |
| JP | 09330066 A | * | 12/1997 | ............ G09G/5/00 |

* cited by examiner

Primary Examiner—Richard Hjerpe
Assistant Examiner—Alexander Eisen
(74) Attorney, Agent, or Firm—Robert E. Bushnell, Esq.

(57) ABSTRACT

A method and an apparatus for outputting an on-screen display (OSD) of a display device are capable of preventing the display device from being damaged by the OSD, which represents an operation state of the display device. If an OSD activation signal which represents an abnormal state of the display device is inputted, a control section controls an OSD circuit section and outputs the OSD. If an output time of the OSD exceeds a predetermined reference time, a control section changes an output position of the OSD. The control section outputs the OSD to the changed output position. The control section repeatedly executes an operation for changing the output position of the OSD based on whether or not the output time of the OSD outputted to the changed output position exceeds the predetermined reference time. Accordingly, the method and apparatus are able to prevent a display device, such as a cathode-ray tube and a liquid crystal display, from being damaged by display of the OSD at one output position of the display device for a long time. Also, the method and apparatus are able to prevent the life of the display device from decreasing.

7 Claims, 12 Drawing Sheets

METHOD AND APPARATUS FOR OUTPUTTING AN ON-SCREEN DISPLAY OF A DISPLAY DEVICE

CLAIM OF PRIORITY

This application makes reference to, incorporates the same herein, and claims all benefits accruing under 35 U.S.C. §119 from an application for Method and Apparatus for Outputting an On-Screen Display of a Display Device earlier filed in the Korean Industrial Property Office on Apr. 27 1998 and there duly assigned Serial No. 98-15005 and an application for Method and Apparatus for Outputting an On-Screen Display of a Display Device earlier filed in the Korean Industrial Property Office on Nov. 30, 1998 and there duly assigned Serial No. 52071.

BACKGROUND OF THE INVENTION

TECHNICAL FIELD

The present invention relates to a method and an apparatus for outputting an on-screen display (hereinafter, referred to as "OSD"), and more particularly, to a method and an apparatus for outputting an OSD of a display device, the method and apparatus being capable of preventing the display device from being damaged by the OSD which represents an operation state of the display device.

RELATED ART

In general, a display device (such as a monitor of a computer system) has an OSD function for displaying a state of the display device.

When the display device operates in an abnormal state (for example, a cable connector which connects the display device to an external system is disconnected) a controller of the display device displays a warning message, such as "check signal cable", on a screen of the display device having an OSD function.

U.S. Pat. No. 5,670,972 (granted to Kim Young-Hee), entitled "SELF-DIAGNOSIS ARRANGEMENT FOR A VIDEO DISPLAY AND METHOD OF IMPLEMENTING THE SAME," discloses the OSD function of the display device and a method for indicating an abnormal state of the display device.

However, in the prior OSD function of the display device described above, the OSD is fixedly displayed on a predetermined output position of the screen of the display device for a long time. Accordingly, in a case where the display device is a cathode-ray tube, luminous materials applied to a fluorescent screen of the cathode-ray tube damage the screen. Consequently, the life of the display device decreases.

Also, where the display device is a liquid crystal display, the liquid crystal display is damaged by a direct current voltage due to an electric charge accumulated in the liquid crystal display.

SUMMARY OF THE INVENTION

Therefore, it is an object of the present invention to provide a method for outputting an OSD of a display device, which is capable of preventing the display device from being damaged by the OSD.

It is another object of the present invention to provide an apparatus for outputting an OSD of a display device, the apparatus being capable of preventing the display device from being damaged by the OSD.

In order to achieve the above objects, the present invention provides a method for outputting an on-screen display of a display device, which comprises the steps of:
  (i) outputting an on-screen display based on whether or not an on-screen display activation signal, which represents an abnormal state of a display device, is inputted;
  (ii) changing an output position of the on-screen display based on whether or not an output time of the on-screen display in step (I) exceeds a predetermined reference time;
  (iii) outputting the on-screen display to the output position changed in step (ii); and
  (iv) returning to step (ii) or step (iii) based on whether or not the output time of the on-screen display in step (iii) exceeds the predetermined reference time.

In order to achieve the above objects, the present invention provides an apparatus for outputting an on-screen display of a display device, which comprises:
  an on-screen display circuit section for outputting an on-screen display signal in response to an on-screen display output signal and an on-screen display output position changing signal, and for stopping the output of the on-screen display signal in response to an on-screen display erasing signal;
  a video outputting section for outputting either a video screen or an on-screen display to the display device in response to a video signal from an external source or the on-screen display signal from said on-screen display circuit section; and
  a control section for monitoring whether or not an on-screen display activation signal, which represents an abnormal state of the display device, is inputted from the outside, for supplying the on-screen display output signal to said on-screen display circuit section when the on-screen display activation signal is inputted, for counting an output time of the on-screen display outputted to the display device, for supplying the on-screen display output position changing signal in order to change an output position of the on-screen display to said on-screen display circuit section based on whether or not the output time of the on-screen display exceeds a predetermined reference time, for monitoring whether or not an on-screen display deactivation signal, which represents a normal state of the display device, is inputted from the outside, and for supplying the on-screen display erasing signal to said on-screen display circuit section when the on-screen display deactivation signal is inputted.

In order to achieve the above objects, the present invention provides a method for outputting an on-screen display of a display device, which comprises the steps of:
  (a) outputting an on-screen display based on whether or not an on-screen display activation signal, which represents an abnormal state of a display device, is inputted; and
  (b) erasing the on-screen display based on whether or not an output time of the on-screen display exceeds a predetermined reference time.

In order to achieve the above objects, the present invention provides an apparatus for outputting an on-screen display of a display device, which comprises:
  an on-screen display circuit section for outputting or stopping an on-screen display signal in response to an on-screen display output signal or an on-screen display erasing signal;
  a video outputting section for outputting either a video screen or an on-screen display to the display device in response to a video signal from an external source or the on-screen display signal from said on-screen display circuit section; and a control section for monitoring whether or not an on-screen display activation signal which represents an abnormal state of the display device is inputted from an external source, for supplying the on-screen display output signal to said on-screen display circuit section when the on-screen display activation signal is inputted, for monitoring whether or not an on-screen display deactivation signal which represents a normal state of the display device is inputted from the external source, for supplying the on-screen display erasing signal to said on-screen display circuit section when the on-screen display deactivation signal is inputted, for counting an output time of the on-screen display outputted to the display device, and for supplying the on-screen display erasing signal in order to stop output of the on-screen display to said on-screen display circuit section based on whether or not the output time of the on-screen display exceeds a predetermined reference time.

In order to achieve the above objects, the present invention provides a method for outputting an on-screen display of a display device, which comprises the steps of:

(A) outputting an on-screen display based on whether or not an on-screen display activation signal which represents an abnormal state of a display device is inputted;

(B) erasing temporarily the on-screen display based on whether an output time of the on-screen display in step (A) exceeds a predetermined first reference time;

(C) changing an output position of the on-screen display based on whether or not an erasing time of the on-screen display in step (B) exceeds a predetermined second reference time;

(D) outputting the on-screen display to the output position changed in step (C); and (E) returning to step (C) or step (D) based on whether or not an output time of the on-screen display in step (D) exceeds a predetermined third reference time In order to achieve the above objects, the present invention provides an apparatus for outputting an on-screen display of a display device, which comprises:

an on-screen display circuit section for outputting an on-screen display signal in response to an on-screen display output signal and an on-screen output position changing signal, for stopping temporarily the output of the on-screen display signal in response to an on-screen display temporarily-erasing signal, and for stopping the output of the on-screen display in response to an on-screen display erasing signal;

a video outputting section for outputting either a video screen or an on-screen display to the display device in response to a video signal from an external source or the on-screen display signal from said on-screen display circuit section; and a control section for monitoring whether or not an on-screen display activation signal which represents an abnormal state of the display device is inputted from the external source, for supplying the on-screen display output signal to said on-screen display circuit section when the on-screen display activation signal is inputted, for counting an output time of the on-screen display outputted to the display device, for supplying the on-screen display temporarily-erasing signal in order to temporarily erase the on-screen display to said on-screen display circuit section based on whether or not the output time of the on-screen display exceeds a predetermined first reference time, for supplying the on-screen display output position changing signal in order to change the output position of the on-screen display to said on-screen display circuit section based on whether or not the output time of the on-screen display exceeds either a predetermined second reference time or a predetermined third reference time, for monitoring whether or not an on-screen display deactivation signal is inputted, and for supplying the on-screen display erasing signal to said on-screen display circuit section when the on-screen display deactivation signal is inputted.

In order to achieve the above objects, the present invention provides a method for outputting an on-screen display of a display device, which comprises the steps of:

(F) monitoring whether or not a frequency range of horizontal and vertical sync signals is within the scope of a predetermined frequency range so as to check a state of a display device;

(G) executing a normal operation routine when the state of the display device is a normal state;

(H) checking whether or not an operation mode of the display device is a power saving mode when the state of the display device is an abnormal state;

(I) setting a flag corresponding to the power saving mode to execute the power saving mode when the operation mode of the display device is the power saving mode; and (J) setting a flag corresponding to the abnormal state so as to output an on-screen display when the operation mode of the display device is not the power saving mode.

In order to achieve the above objects, the present invention provides a method for outputting an on-screen display of a display device, which comprises the steps of:

(K) initializing a start position of the on-screen display when a power source is applied to a display device;

(L) outputting a message for setting an output mode of the on-screen display;

(M) setting the output mode of the on-screen display in response to a key signal generated by a user;

(N) checking whether or not an on-screen display activation signal which represents an abnormal state of the display device is inputted;

(O) executing a normal operation routine when the on-screen display activation signal is not inputted; and (P) displaying the on-screen display corresponding to the output mode set by the user among a moving mode, an erasing mode and a moving/erasing mode on the display device when the on-screen display activation signal is inputted.

In the method and apparatus for outputting the OSD of the display device according to the present invention, the output mode of the OSD which represents the abnormal state of the display device is one of the moving mode, the erasing mode and the erasing/moving mode. Accordingly, it is able to prevent the display device (such as the cathode-ray tube and liquid crystal display) from being damaged by displaying the OSD on the one output position of the display device for a long time. Also, it is able to prevent the life of the display device from decreasing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

A description will be given below in detail with reference to the accompanying drawings as to a configuration and an operation of a method and an apparatus for outputting an on-screen display of a display device according to the embodiments of the present invention.

Embodiment 1

Figure 1:
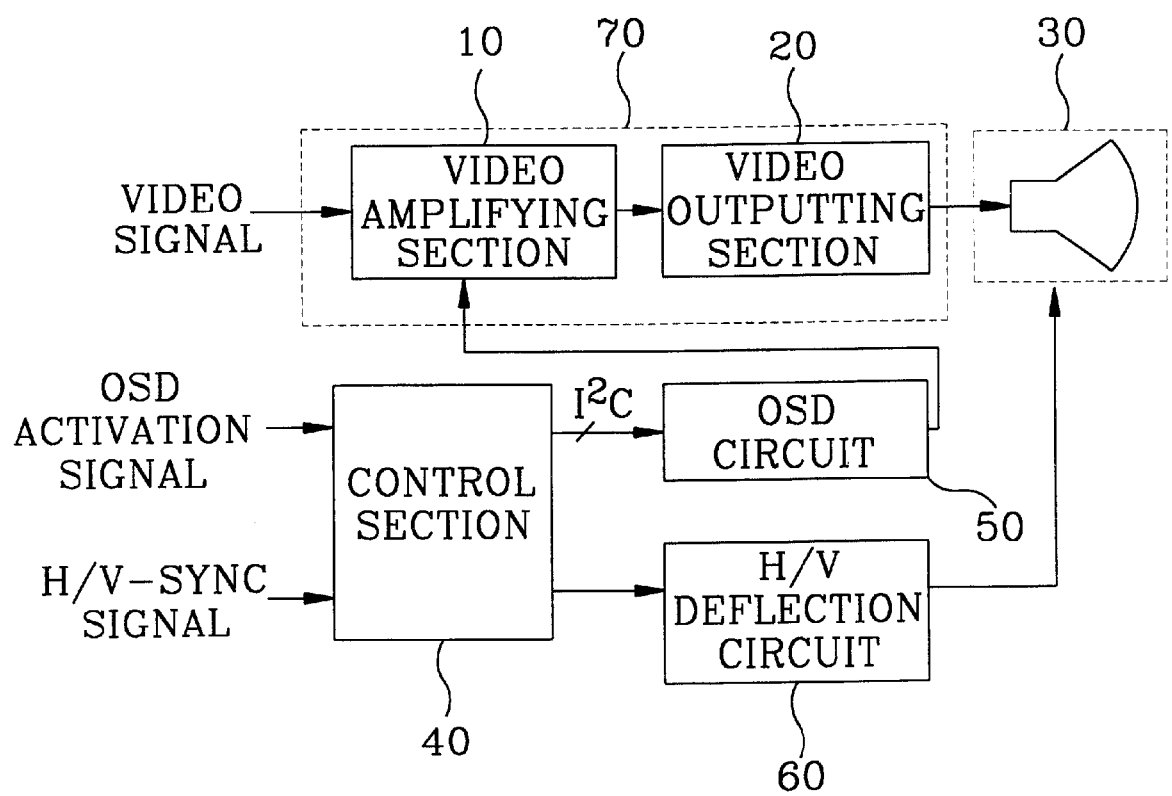
FIG. 1 is a block diagram showing the configuration of an apparatus for outputting an on-screen display of a display device according to a first embodiment of the present invention.

FIG. 1 is a block diagram showing the configuration of an apparatus for outputting an on-screen display of a display device according to a first embodiment of the present invention.

Referring to FIG. 1, the apparatus for outputting the OSD according to the first embodiment of the present invention has a video amplifying section 10 for amplifying a video signal and an OSD signal, a video outputting section 20 for outputting the video signal and the OSD signal received from video amplifying section 10, a cathode-ray tube 30 for displaying a video screen or the OSD to a user in response to the video signal and the OSD signal from video outputting section 20, a control section 40 for outputting an OSD output signal or an OSD erasing signal in response to an OSD activation signal or an OSD deactivation signal (not shown), for counting an output time of the OSD to output an OSD output position changing signal and for outputting a control signal in response to horizontal and vertical sync signals (hereinafter, referred to as "H/V sync signals"), an OSD circuit section 50 for outputting the OSD signal in response to the OSD output signal and for stopping the OSD signal in response to the OSD erasing signal, and an H/V deflection circuit section 60 for supplying a deflection signal to cathode ray-tube 30 in response to the control signal from control section 40.

Firstly, when a power source is applied to cathode-ray tube 30, control section 40 supplies the OSD output signal to OSD circuit section 50 in response to the OSD activation signal which represents an abnormal state of cathode-ray tube 30, that is, cathode-ray tube 30 is disconnected from an external system.

OSD circuit section 50 supplies the OSD signal to video amplifying section 10 in response to the OSD output signal. At this time, since cathode-ray tube 30 is disconnected from the external system, the video signal is not applied to video amplifying section 10.

When the OSD signal from OSD circuit section 50 is displayed on a screen of cathode-ray tube 30 as the OSD through video amplifying section 10 and video outputting section 20, control section 40 counts the output time of the OSD.

If the output time of the OSD exceeds a predetermined reference time, control section 40 supplies the OSD output position changing signal to OSD circuit section 50. Accordingly, the OSD which is displayed on the screen of cathode-ray tube 30 moves from an initial output position to a new output position. The operation for changing the output position of the OSD as described above is repeatedly executed until the OSD deactivation signal is applied to control section 40. At this time, the predetermined reference time is within the scope of time in which the luminous materials are not damaged.

Next, when the OSD deactivation signal, which represents a normal state of cathode-ray tube 30 (that is, cathode-ray tube 30 is connected to an external system), is applied to control section 40, control section 40 supplies the OSD erasing signal to OSD circuit section 50 to erase the OSD displayed on the screen of cathode-ray tube 30.

Figure 2:
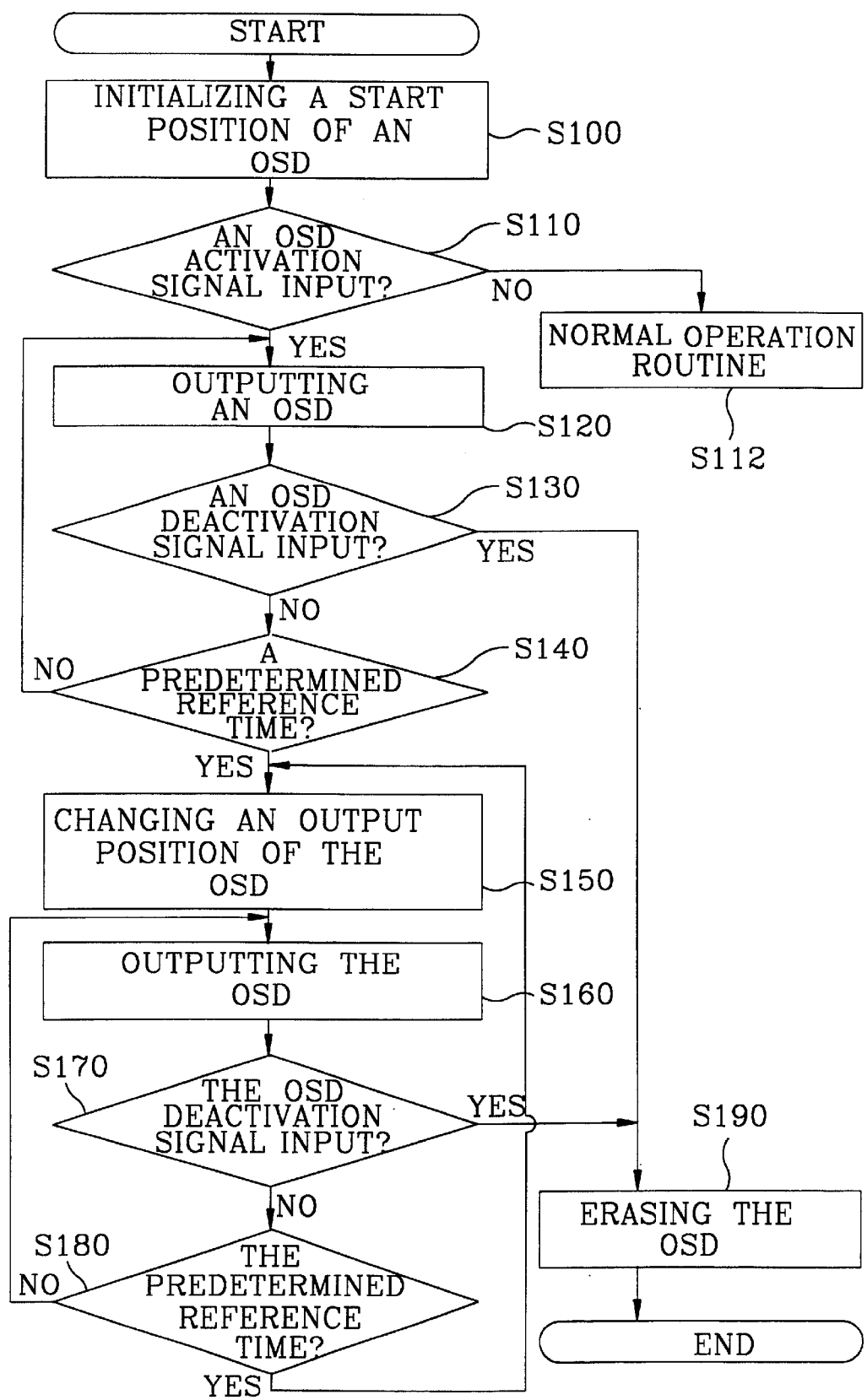
FIG. 2 is a flowchart illustrating a method for outputting the on-screen display of the display device according to the first embodiment of the present invention.

A description of the procedure of the method for outputting the OSD of the display device, as performed by the apparatus shown in FIG. 1, will now be provided with reference to the flowchart of FIG. 2.

Figure 3:
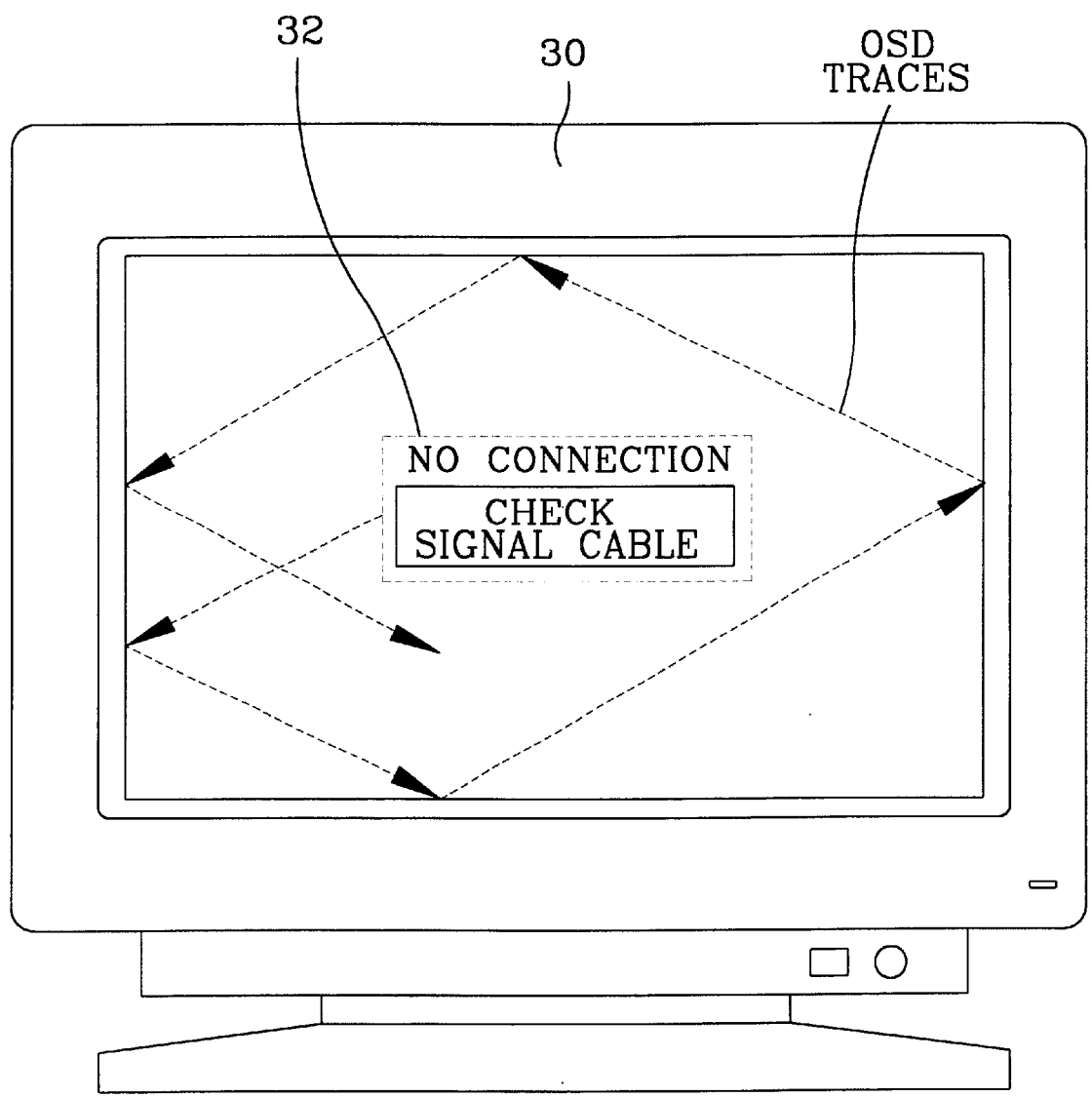
FIGS. 3 and 4 are a state view showing an output state of the on-screen display according to the first embodiment of the present invention.
Figure 4:
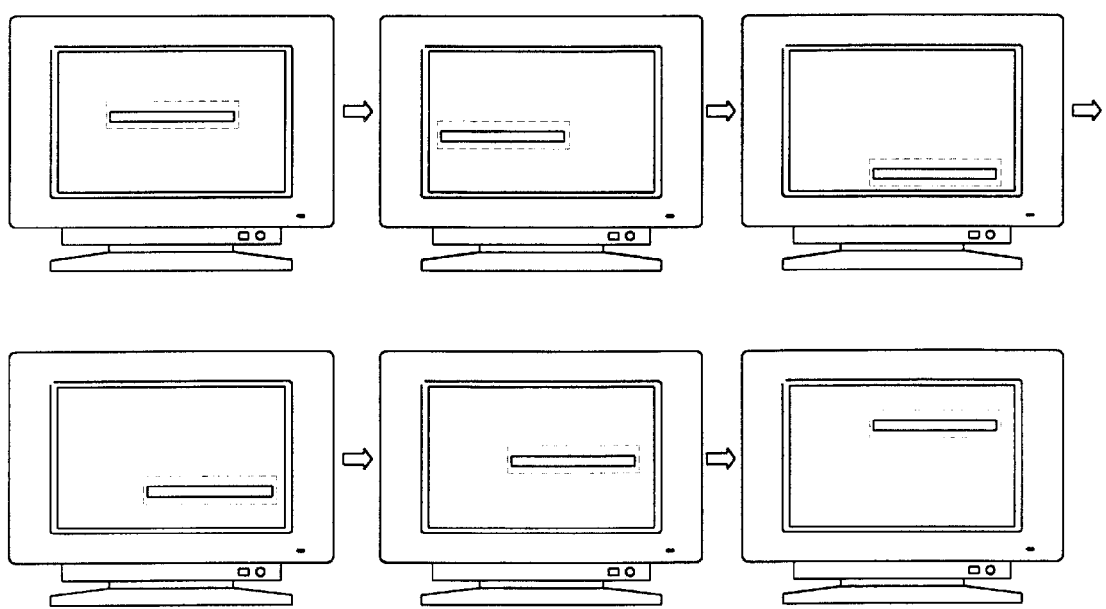

FIG. 2 is a flowchart illustrating a method for outputting the on-screen display of the display device according to the first embodiment of the present invention. FIGS. 3 and 4 are a state view showing an output state of the on-screen display according to the first embodiment of the present invention.

Referring to FIG. 2, when the power source is applied to the display device, control section 40 initializes a start position of the OSD (step S100).

Control section 40 determines whether or not the OSD activation signal which represents the abnormal state of the display device is inputted (step S110). If the OSD activation signal is not inputted, control section 40 executes a normal operation routine (step S112). If the OSD activation signal is inputted, control section 40 supplies the OSD output signal to OSD circuit section 50 to output the OSD (step S120).

Next, control section 40 determines whether or not the OSD deactivation signal, which represents the normal state of the display device, is inputted (step S130). If the OSD deactivation signal is inputted, control section 40 supplies the OSD erasing signal to OSD circuit section 50 and erases the OSD (step S190).

If the OSD deactivation signal is not inputted, control section 40 determines whether or not the output time of the OSD in step S120 exceeds the predetermined reference time (step S140).

If the output time of the OSD in step S120 does not exceed the predetermined reference time, control section 40 returns to step S120. If the output time of the OSD in step S120 exceeds the predetermined reference time, control section 40 supplies the OSD output position changing signal to OSD circuit section 50 to change the output position of the OSD (step S150).

Control section 40 supplies the OSD output signal to OSD circuit section 50 in order to display the OSD on the output position changed in step S150 (step S160).

Control section 40 determines whether or not the OSD deactivation signal is inputted (step S170). If the OSD deactivation signal is inputted, control section 40 supplies the OSD erasing signal to OSD circuit section 50 and erases the OSD displayed on the changed output position (step S190). If the OSD deactivation signal is not inputted, control section 40 determines whether or not an output time of the OSD displayed on the changed output position exceeds the predetermined reference time (step S180).

If the output time of the OSD displayed on the changed output position does not exceed the predetermined reference time, control section 40 returns to step S160. If the output time of the OSD displayed on the changed output position exceeds the predetermined reference time, control section 40 returns to step S150 to change the output position of the OSD.

According to the method as described above, the OSD is not fixedly displayed on one output position of cathode-ray tube 30 as shown in FIGS. 3 and 4. Accordingly, it is able to prevent cathode-ray tube 30 from being damaged due to display of the OSD on one output position of the display device for a long time.

Embodiment 2

Figure 5:
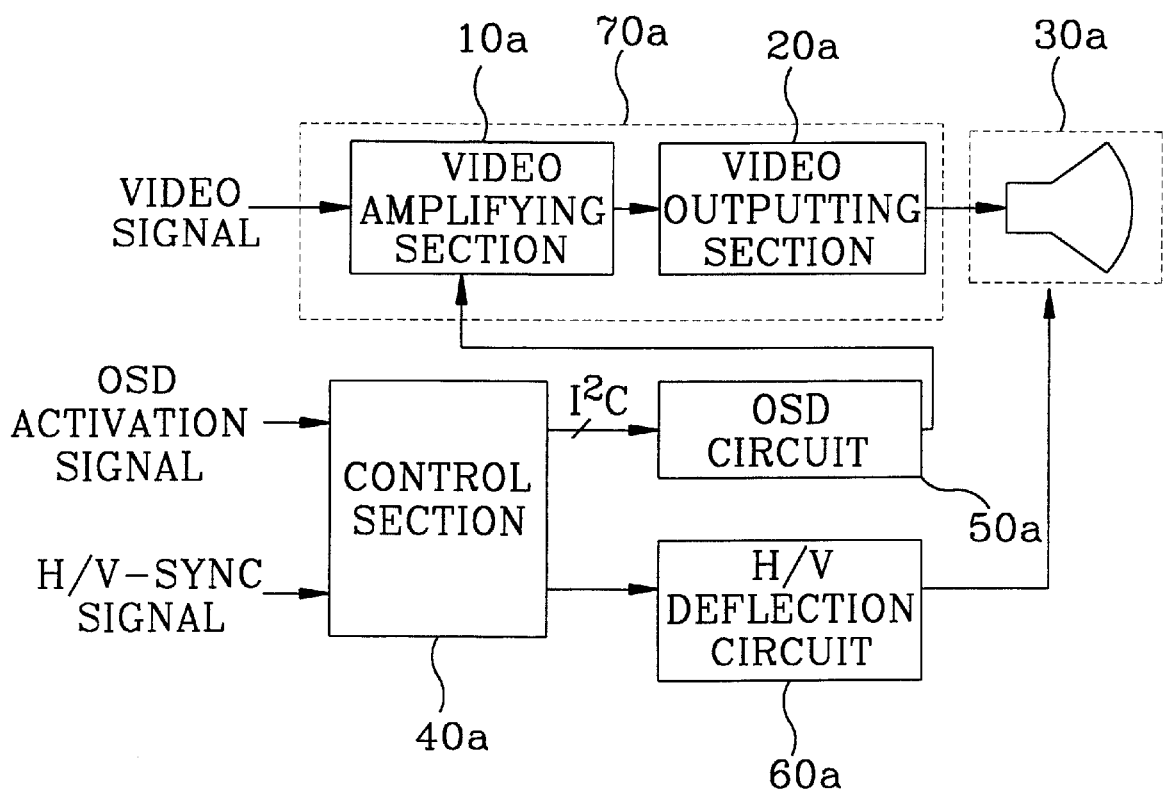
FIG. 5 is a block diagram showing the configuration of an apparatus for outputting an on-screen display of a display device according to a second embodiment of the present invention.

FIG. 5 is a block diagram showing the configuration of an apparatus for outputting an on-screen display of a display device according to a second embodiment of the present invention.

Referring to FIG. 5, the apparatus for outputting the OSD of the display device according to the second embodiment of the present invention has a video amplifying section 10*a*, a video outputting section 20*a*, a cathode-ray tube 30*a*, a control section 40*a* and a H/V deflection circuit section 60*a*. In this embodiment, video amplifying section 10*a*, video outputting section 20*a*, cathode-ray tube 30*a* and H/V deflection circuit section 60*a* execute operations which are identical to the operations of the corresponding elements of the apparatus for outputting the OSD of the display device according to the first embodiment of the present invention, as described above.

Control section 40*a* monitors whether or not the OSD activation signal which represents the abnormal state of the display device is inputted. If the OSD activation signal is inputted, control section 40*a* supplies the OSD output signal to OSD circuit section 30*a* to output the OSD. When the OSD output signal is outputted from control section 40*a*, OSD circuit section 30*a* outputs the OSD signal and control section 40*a* counts the output time of the OSD outputted to cathode-ray tube 30. If either the output time of the OSD exceeds the predetermined reference time or the OSD deactivation signal which represents the normal state of the display device is inputted, control section 40*a* supplies the OSD erasing signal to OSD circuit section 50*a*. Accordingly, the OSD displayed to the user through cathode-ray tube 30*a* is erased. At this time, the predetermined reference time is within the scope of time in which the luminous materials are not damaged.

Figure 6:
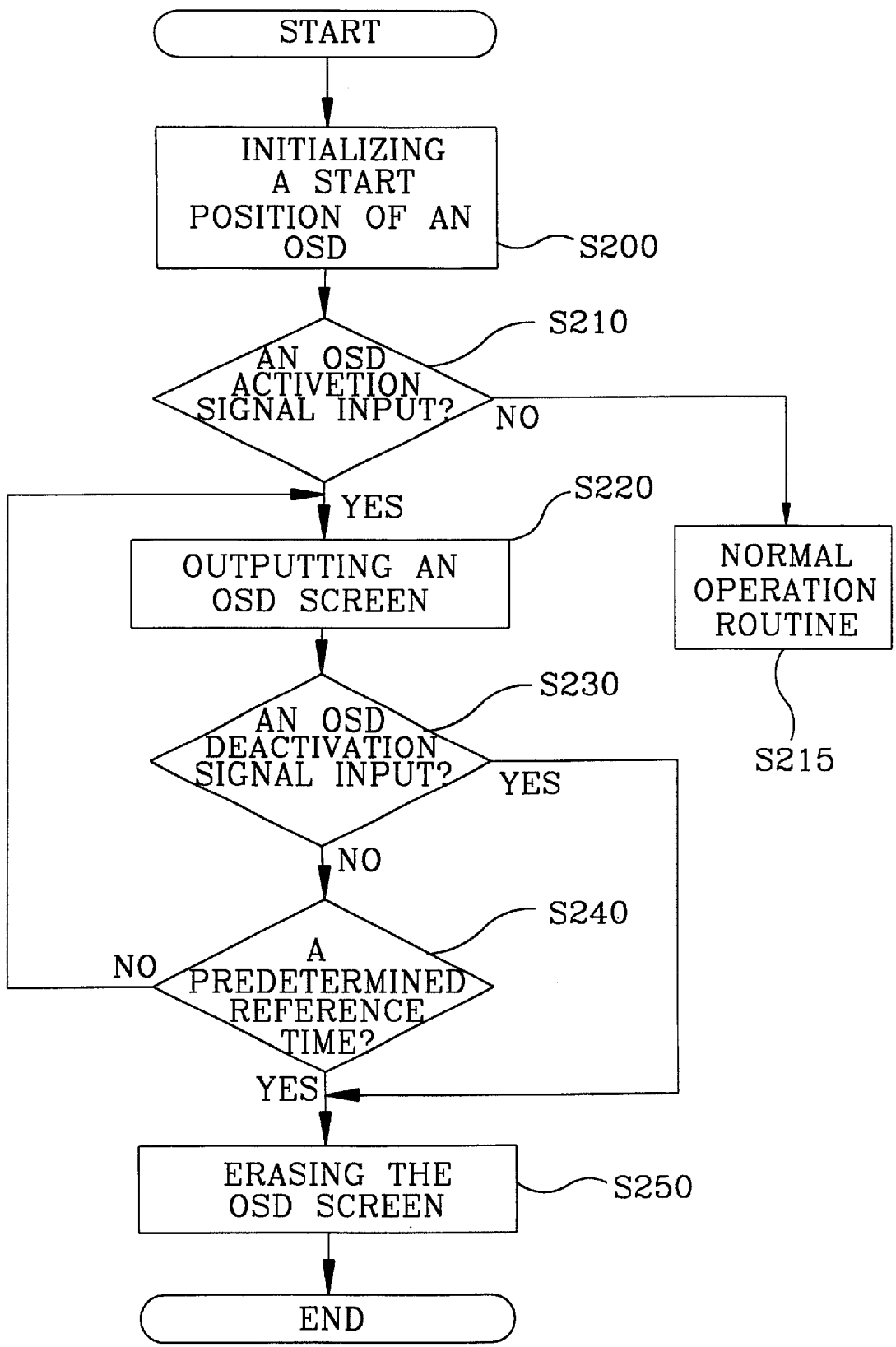
FIG. 6 is a flowchart illustrating a method for outputting the on-screen display of the display device according to the second embodiment of the present invention.

FIG. 6 is a flowchart illustrating a method for outputting the on-screen display of the display device by using the apparatus shown in FIG. 5.

Referring to FIG. 6, when the power source is applied to the display device, control section 40*a* initializes the start position of the OSD (step S200).

Control section 40*a* checks whether or not the OSD activation signal, which represents the abnormal state of the display device, is inputted (step S210). If the OSD activation signal is not inputted, control section 40*a* executes a normal operation routine (step S215). If the OSD activation signal is inputted, control section 40*a* supplies the OSD output signal to OSD circuit section 50*a* and outputs the OSD to cathode-ray tube 30*a* (step S220).

Next, control section 40*a* checks whether or not the OSD deactivation signal, which represents the normal state of the display device, is inputted (step S230). If the OSD deactivation signal is inputted, control section 40*a* supplies the OSD erasing signal to OSD circuit section 50*a* and erases the OSD displayed to the user through cathode-ray tube 30*a* (step S250).

If the OSD deactivation signal is not inputted, control section 40*a* determines whether or not the output time of the OSD exceeds the predetermined reference time (step S240).

If the output time of the OSD does not exceed the predetermined reference time, control section 40*a* returns to step S220 and continually outputs the OSD to the user. If the output time of the OSD exceeds the predetermined reference time, control section 40*a* supplies the OSD erasing signal to OSD circuit section 50*a* and erases the OSD (step S250).

According to the method as described above, the OSD is displayed on one output position of the screen of cathode-ray tube 30. However, the OSD is erased before the luminous materials of the cathode-ray tube 30*a* are damaged, so that damage to the cathode-ray tube 30*a* may be prevented.

Embodiment 3

Figure 7:
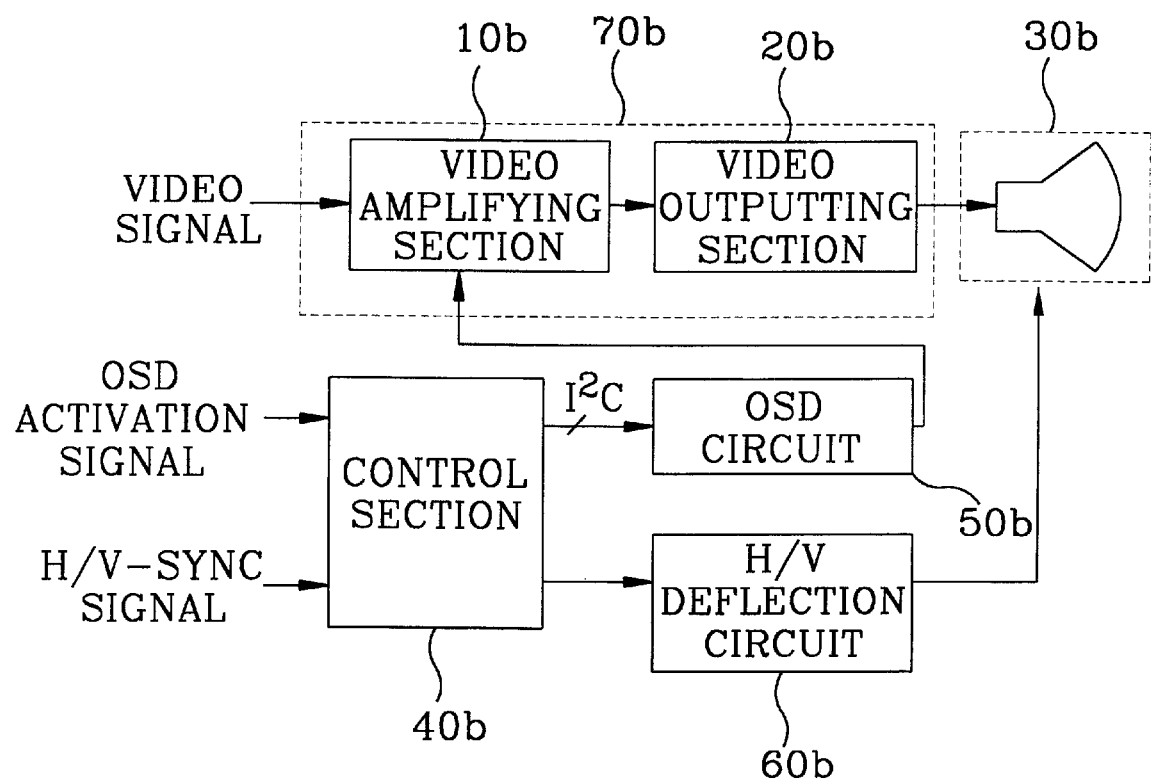
FIG. 7 is a block diagram showing the configuration of an apparatus for outputting an on-screen display of a display device according to a third embodiment of the present invention.

FIG. 7 is a block diagram showing the configuration of an apparatus for outputting an on-screen display of a display device according to a third embodiment of the present invention.

Referring to FIG. 7, the apparatus for outputting the OSD of the display device according to the third embodiment of the present invention has a video amplifying section 10*b*, a video outputting section 20*b*, a cathode-ray tube 30*b*, a control section 40*b*, an OSD circuit section 50*b* and a H/V deflection circuit section 60*b*. Here, video amplifying section 10*b*, video outputting section 20*b*, cathode-ray tube 30*b* and HNV deflection circuit section 60*b* execute operations which are identical to the operations of the corresponding elements of the apparatus for outputting the OSD of the display device according to the first embodiment of the present invention described above.

Control section 40*b* monitors whether or not the OSD activation signal which represents the abnormal state of the display device is inputted. If the OSD activation signal is inputted, control section 40*b* supplies the OSD output signal to OSD circuit section 30*b* to output the OSD.

Control section 40b counts the output time of the OSD. If the output time of the OSD exceeds a predetermined first reference time, control section 40b supplies an OSD temporary-erasing signal to OSD circuit section 50b to temporarily erase the OSD displayed through cathode-ray tube 30b to the user.

If the output time of the OSD exceeds either a predetermined second reference time or a predetermined third reference time, control section 40b supplies the OSD output position changing signal to OSD circuit section 50b to change the output position of the OSD displayed to the user through cathode-ray tube 30b.

Also, if the OSD deactivation signal which represents the normal state of the display device is inputted, control section 40b supplies the OSD erasing signal to OSD circuit section 50b to erase the OSD displayed to the user through cathode-ray tube 30b. Here, the predetermined first reference time is identical with the predetermined third reference time and the predetermined second reference time is shorter than the predetermined first and third reference times.

Figure 8:
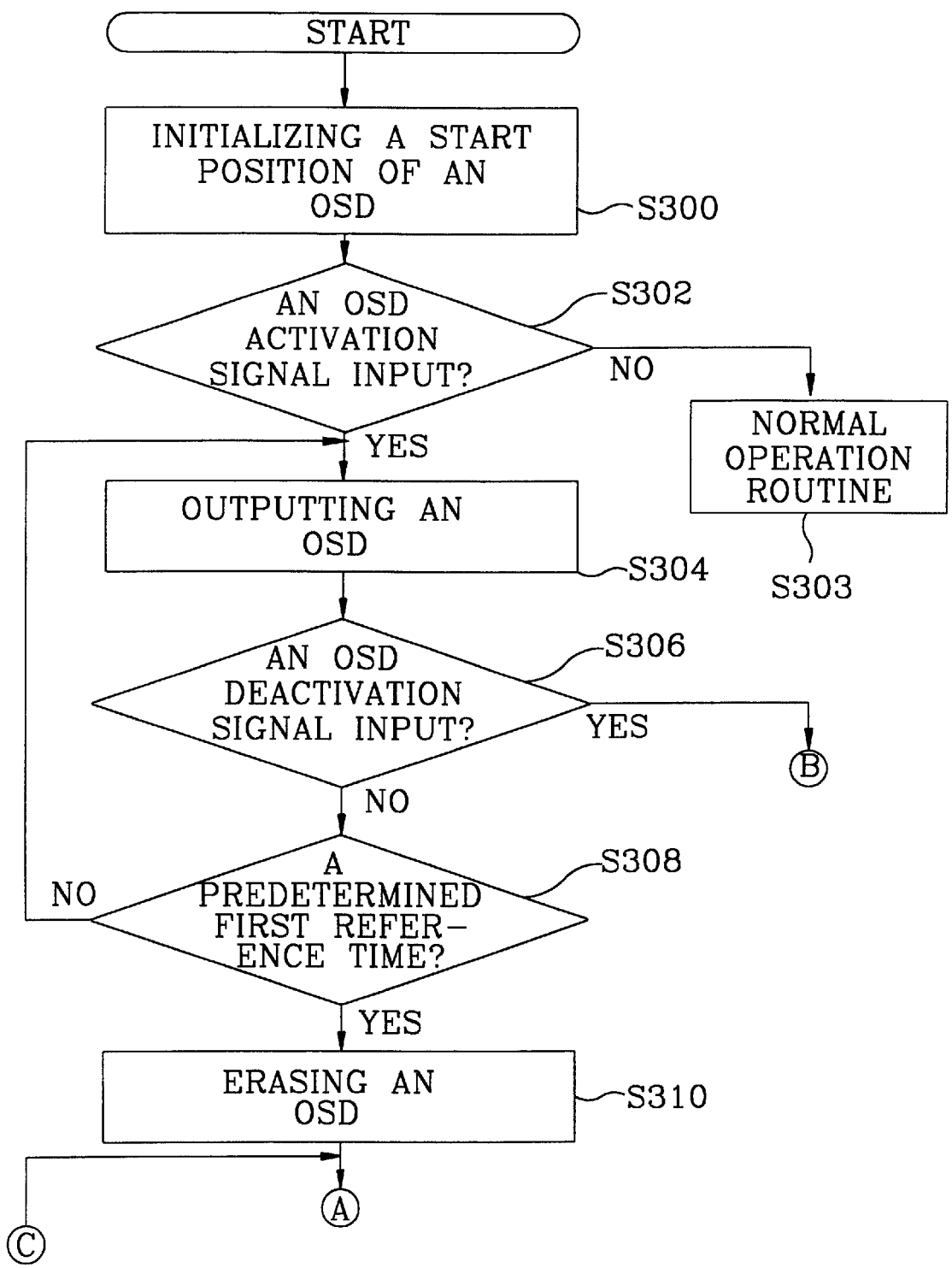
FIGS. 8 and 9 are a flowchart illustrating a method for outputting the on-screen display of the display device according to the third embodiment of the present invention.
Figure 9:
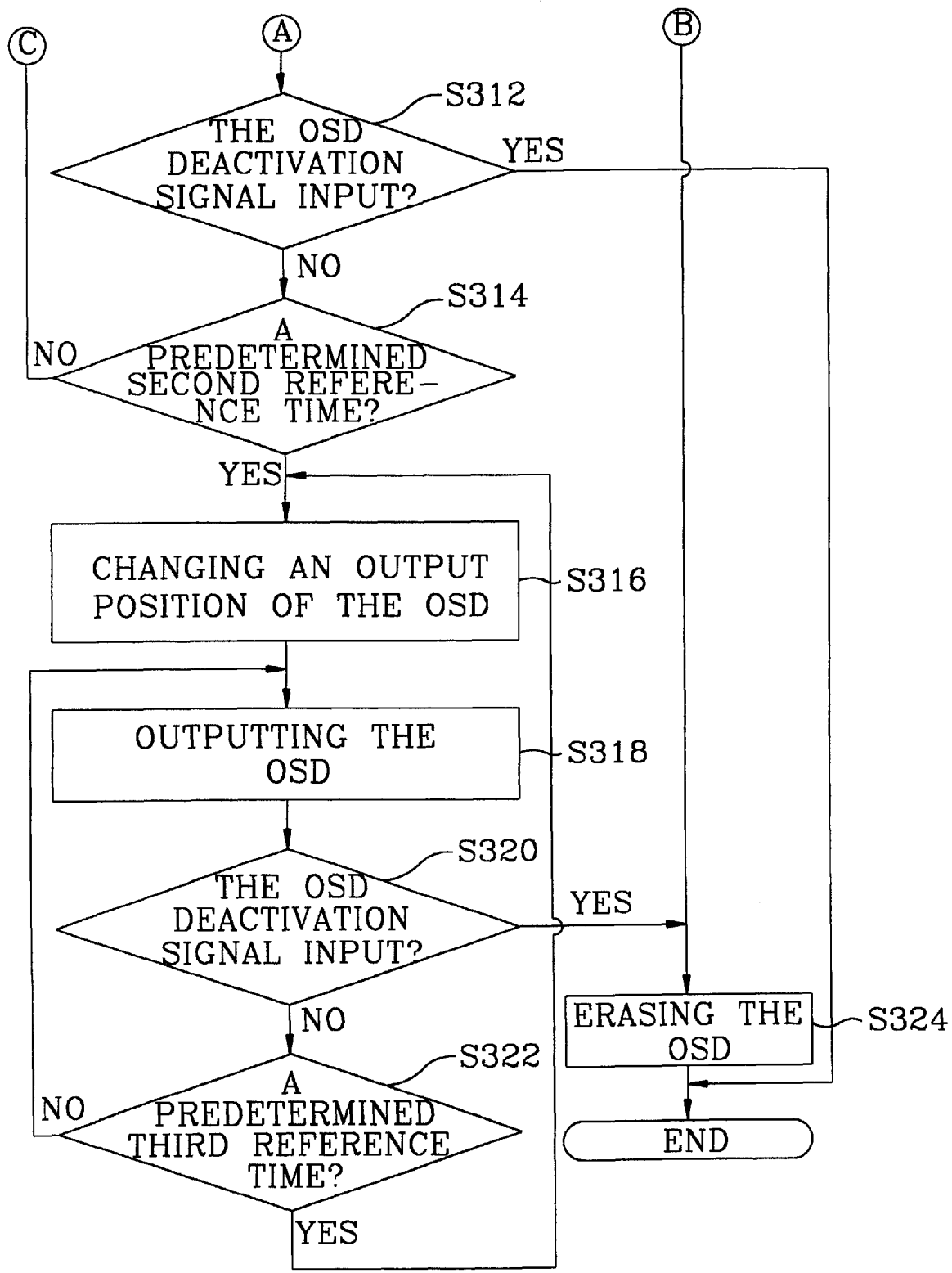

FIGS. 8 and 9 are a flowchart illustrating a method for outputting the on-screen display of the display device according to the third embodiment of the present invention.

Referring to FIGS. 8 and 9, when the power source is applied to the display device, control section 40b initializes a start position of the OSD (step S300).

Control section 40b determines whether or not the OSD activation signal, which represents the abnormal state of the display device, is inputted (step S302). If the OSD activation signal is not inputted, control section 40b executes a normal operation routine (step 303). If the OSD activation signal is inputted, control section 40b supplies the OSD output signal to OSD circuit section 50b and outputs the OSD to cathode-ray tube 30b (step S304).

Next, control section 40b determines whether or not the OSD deactivation signal which represents the normal state of the display device is inputted (step S306). If the OSD deactivation signal is inputted, control section 40b supplies the OSD erasing signal to OSD circuit section 50b and erases the OSD displayed to the user through cathode-ray tube 30b (step S324).

If the OSD deactivation signal is not inputted, control section 40b determines whether or not the output time of the OSD in step S304 exceeds the predetermined first reference time (step S308).

If the output time of the OSD in step S304 does not exceed the predetermined first reference time, control section 40b returns to step S304 and continually outputs the OSD.

If the output time of the OSD in step S304 exceeds the predetermined first reference time, control section 40b supplies the OSD erasing signal to OSD circuit section 50b to temporarily erase the OSD outputted in step S304 (step S310).

Control section 40b determines whether or not the OSD deactivation signal, which represents the normal state of the display device, is inputted (step S312). If the OSD deactivation signal is inputted, control section 40b supplies the OSD erasing signal to OSD circuit section 50b to erase the OSD (step S324).

If the OSD deactivation signal is not inputted, control section 40b determines whether or not the temporary-erasing time of the OSD exceeds the predetermined second reference time (step S314). If the temporary-erasing time of the OSD does not exceed the predetermined second reference time, control section 40b returns to step S312.

IF the temporary-erasing time of the OSD exceeds the predetermined second reference time, control section 40b supplies the OSD output position changing signal to OSD circuit section 50b and changes the output position of the OSD provided to the user through cathode-ray tube 30b (step S316).

Control section 40b supplies the OSD output signal to OSD circuit section 50b and displays the OSD on the output position changed in step S316 (step S318).

Control section 40b determines whether or not the OSD deactivation signal is inputted (step S320). If the OSD deactivation signal is inputted, control section 40b supplies the OSD erasing signal to OSD circuit section 50b and erases the OSD (step S324). If the OSD deactivation signal is not inputted, control section 40b determines whether or not an output time of the OSD in step S318 exceeds the predetermined third reference time (step S322).

If the output time of the OSD in step S318 does not exceed the predetermined third reference time, control section 40b returns to step S318 and continually outputs the OSD. If the output time of the OSD in step S318 exceeds the predetermined third reference time, control section 40b returns to step S316 for changing the output position of the OSD outputted in step S318. Here, the predetermined first reference time is identical with the predetermined third reference time, and the predetermined second reference time is shorter than the predetermined first and third reference times.

According to the method as described above, the OSD is not displayed on one output position of the screen of cathode-ray tube 30b. Also, the OSD repeatedly and alternately executes erasing and displaying operations at respective output positions. Accordingly, it is able to prevent the cathode-ray tube 30b from being damaged by displaying the OSD on the one output position of the display device for a long time.

Embodiment 4

An apparatus for outputting the OSD of the display device according to the fourth embodiment of the present invention has elements which are identical with the those of apparatus for outputting the OSD of the display device shown in FIG. 1. Accordingly, a method for outputting the OSD of the display device according to the fourth embodiment of the present invention is illustrated based on the elements shown in FIG. 1.

Figure 10:
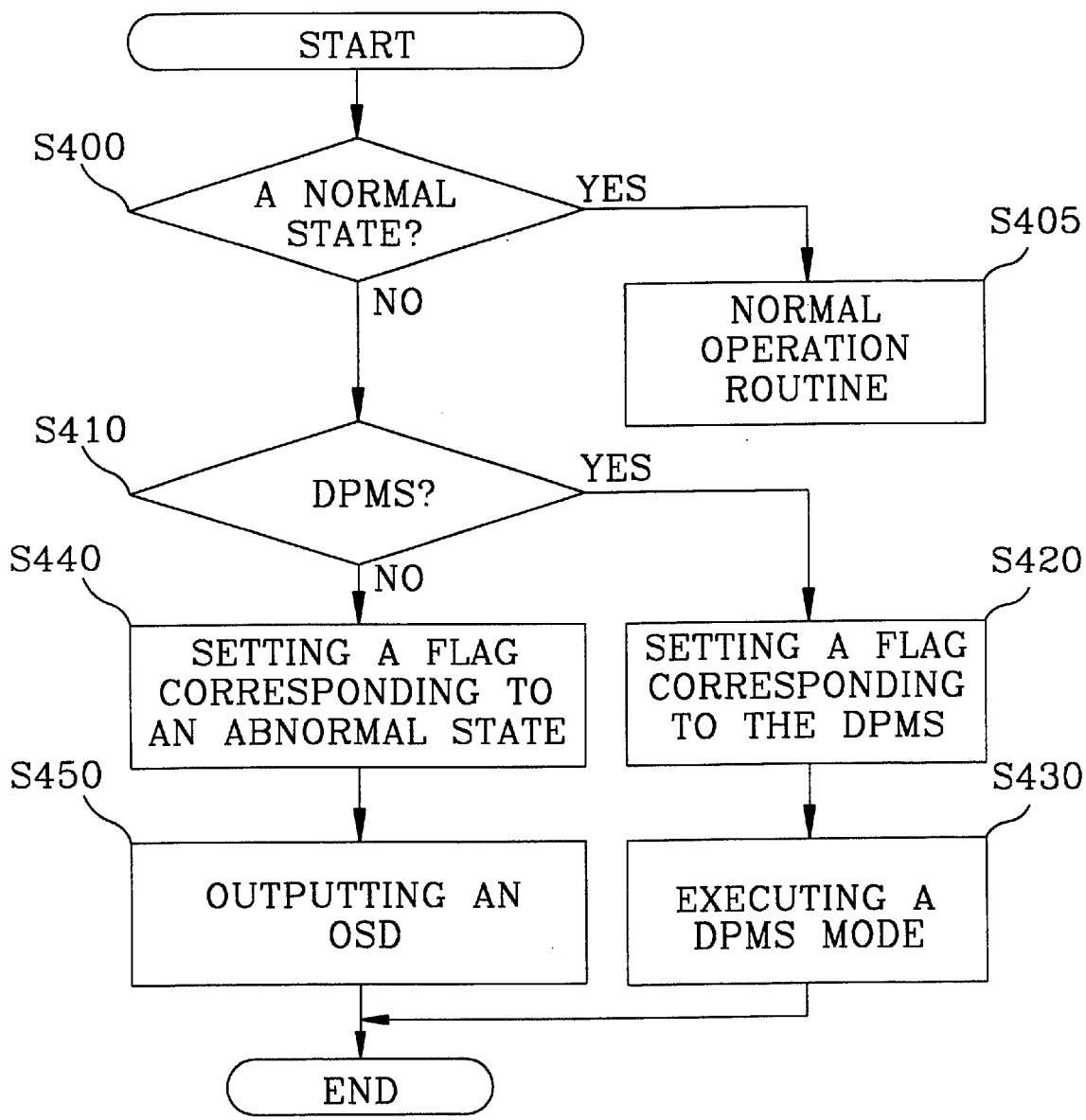
FIG. 10 is a flowchart illustrating a method for outputting the on-screen display of the display device according to the fourth embodiment of the present invention.

FIG. 10 is a flowchart illustrating a method for outputting the on-screen display of the display device according to the fourth embodiment of the present invention.

Referring to FIG. 10, control section 40 monitors whether or not a frequency range of H/V sync signals are within the scope of a predetermined frequency range to determine a state of the display device (step S400).

If an operation mode of the display device is a normal state, control section 40 executes a normal operation routine (step S405). If the operation mode of the display device is an abnormal state, control section 40 determines whether or not an operation mode of the display device is a power saving mode, that is, a display power management system (hereinafter, referred to as "DPMS") mode (step S410).

If the operation mode of the display device is the DPMS mode, control section 40 sets a flag corresponding to the DPMS mode (step S420) and executes the DPMS mode (step S430).

If the operation mode of the display device is not the DPMS mode, control section 40 sets a flag corresponding to the abnormal state (step S440) and outputs the OSD output signal to OSD circuit section 50. Accordingly, the OSD which represents the abnormal state of the display device is outputted to the user through cathode-ray tube 30.

At this time, the output mode of the OSD is one of a moving mode in which the OSD sequentially moves along traces of a plurality of output positions of the display device and is outputted during a predetermined reference time to the respective output positions, an erasing mode in which the OSD is erased after the OSD is outputted to a predetermined output position of the display device during a predetermined reference time, and an erasing/moving mode in which the OSD sequentially moves along traces of a plurality of output positions of the display device and is erased during a predetermined second reference time which is shorter than a predetermined first reference time after the OSD is outputted to the respective output positions during the predetermined first reference time.

Embodiment 5

Figure 11:
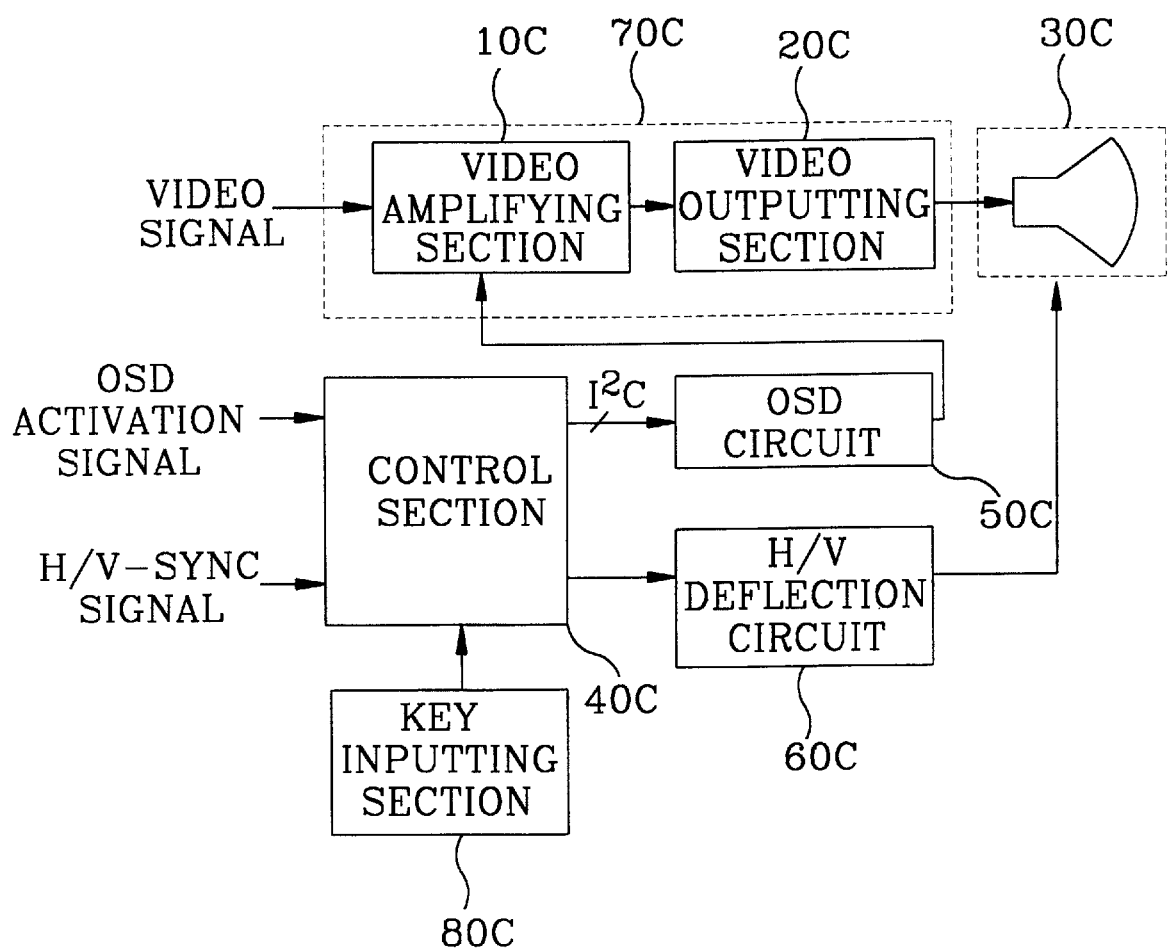
FIG. 11 is a block diagram showing the configuration of an apparatus for outputting an on-screen display of a display device according to a fifth embodiment of the present invention.

FIG. 11 is a block diagram showing the configuration of an apparatus for outputting an on-screen display of a display device according to a fifth embodiment of the present invention.

Referring to FIG. 11, the apparatus for outputting the OSD of the display device according to the fifth embodiment of the present invention has a video amplifying section 10c, a video outputting section 20c, a cathode-ray tube 30c, a control section 40c, an OSD circuit section 50c, an H/V deflection circuit section 60c and a key inputting section 80c. Here, video amplifying section 10c, video outputting section 20c, cathode-ray tube 30c and H/V deflection circuit section 60c execute operations which are identical to the operations of the corresponding elements of the apparatus for outputting the OSD of the display device according to the first embodiment of the present invention described above.

When the user operates keys arranged on key inputting section 80c to set an output mode of the OSD, key inputting section 80c generates a key signal corresponding to the key operated by the user.

Control section 40c outputs a message for indicating the output mode of the OSD to the user through cathode-ray tube 30c. Control section 40c receives the key signal from key inputting section 80c, and selects the output mode of the OSD corresponding to the key signal among a moving mode, an erasing mode and an erasing/moving mode.

Control section 40c monitors whether or not the OSD activation signal, which represents the abnormal state of the display device, is inputted. If the OSD activation signal is inputted, control section 40c supplies the OSD output signal to OSD circuit section 50c in order to output the OSD to the user through cathode-ray tube 30c. Also, if the OSD deactivation signal which represents the normal state of the display device is inputted, control section 40c supplies the OSD erasing signal to OSD circuit section 50c in order to erase the OSD outputted to the user through cathode-ray tube 30c.

Figure 12:
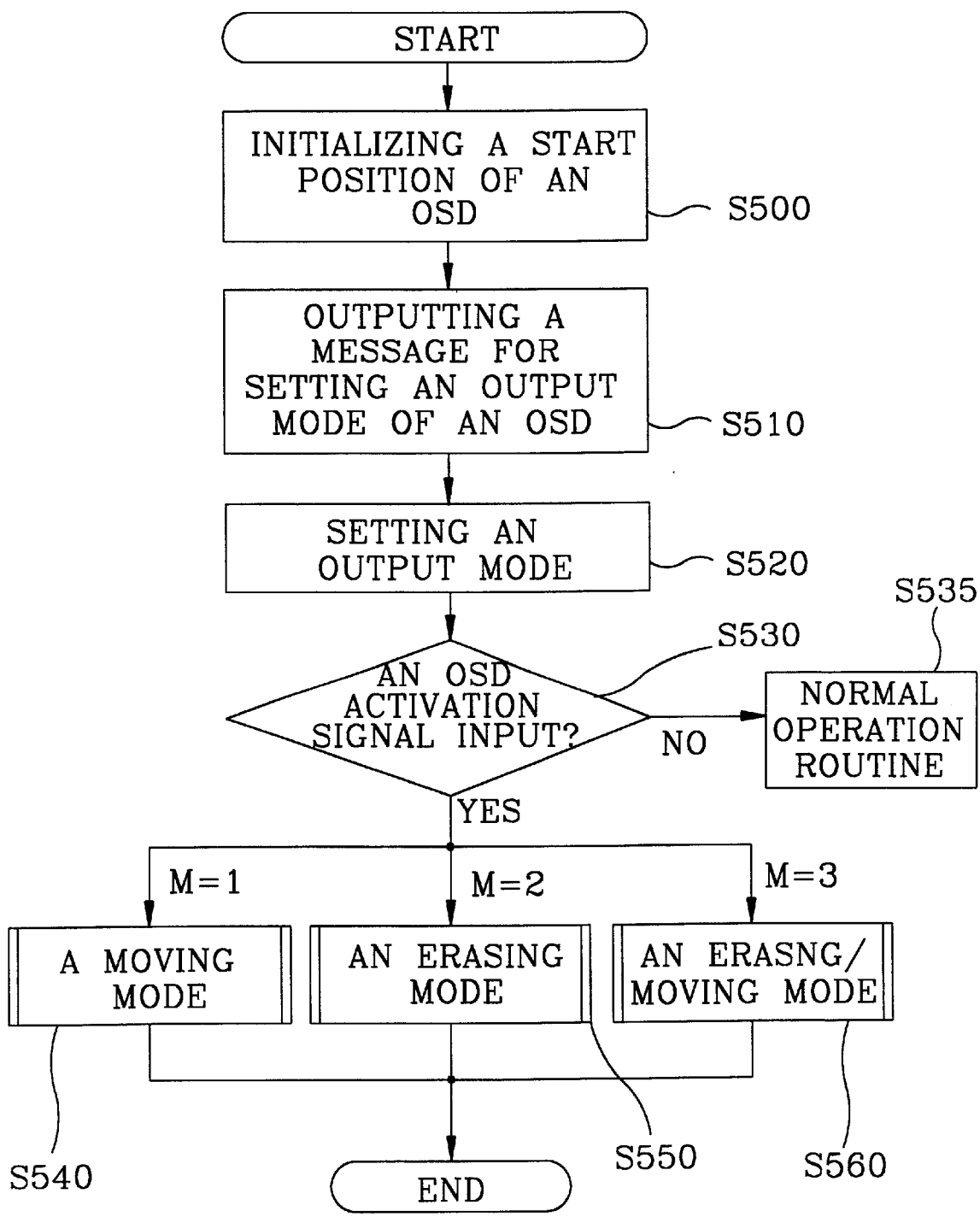
FIG. 12 is a flowchart illustrating a method for outputting the on-screen display of the display device according to the fifth embodiment of the present invention.

FIG. 12 is a flowchart illustrating a method for outputting the on-screen display of the display device according to the fifth embodiment of the present invention.

Referring to FIG. 12, when power is applied to the display device, control section 40c initializes the start position of the OSD (step S500). Control section 40c outputs the message for determining the output mode of the OSD to the user through cathode-ray tube 30c (step S510). Control section 40c sets the output mode of the OSD into one of the moving mode, the erasing mode and the erasing/moving mode in response to the key signal generated by key inputting section 80c by the user (step S520).

Control section 40c determines whether or not the OSD activation signal, which represents the abnormal state of the display device, is inputted (step S530). If the OSD activation signal is not inputted, control section 40c executes a normal operation routine (step S535).

If the OSD activation signal is inputted, control section 40c outputs the OSD corresponding to the output mode set by the user among the moving mode, the erasing mode and the erasing/moving mode through cathode-ray tube 30c (step S540 to S560).

At this time, the moving mode is a mode in which the OSD sequentially moves along traces of a plurality of output positions of the display device and is outputted during a predetermined reference time to the respective output positions.

Also, the erasing mode is a mode in which the OSD is erased after the OSD is outputted to a predetermined output position of the display device during a predetermined reference time.

Also, the moving/erasing mode is a mode in which the OSD sequentially moves along traces of a plurality of output positions of the display device and is erased during a predetermined second reference time which is shorter than a predetermined first reference time after the OSD is outputted to the respective output positions during the predetermined first reference time.

In the method and apparatus for outputting the OSD of the display device, the output mode of the OSD, which represents the abnormal state of the display device, is one of the moving mode, the erasing mode and the erasing/moving mode.

Accordingly, it is able to prevent the display device, such as a cathode-ray tube and a liquid crystal display, from being damaged by displaying the OSD on one output position of the display device for a long time. Also, it is able to prevent the life of the display device from decreasing.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for outputting an on-screen display of a display device, said method comprising the steps of:

(A) outputting an on-screen display based on whether or not an on-screen display activation signal, which represents an abnormal state of a display device, is inputted;

(B) erasing temporarily the on-screen display based on whether an output time of the on-screen display in step (A) exceeds a predetermined first reference time;

(C) changing an output position of the on-screen display based on whether or not an erasing time of the on-screen display in step (B) exceeds a predetermined second reference time;

(D) outputting the on-screen display to the output position changed in step (C); and (E) returning to one of step (C) and step (D) based on whether or not an output time of the on-screen display in step (D) exceeds a predetermined third reference time;

wherein said step (C) comprises the substeps of:

(C-1) determining whether or not the on-screen display deactivation signal is inputted;

(C-2) erasing the on-screen display when the on-screen display deactivation signal is inputted;

(C-3) determining whether or not a time of temporarily erasing the on-screen display exceeds the predetermined second reference time when the on-screen display deactivation signal is not inputted;

(C-4) returning to step (C-1) when the time of temporarily erasing the on-screen display does not exceed the predetermined second reference time; and (C-5) changing the output position of the on-screen display when an erasing time of the on-screen display exceeds the predetermined second reference time.

2. The method as claimed in claim 1, wherein said step (A) comprises the substeps of:

(A-1) initializing a start position of the on-screen display when power is applied to the display device;

(A-2) determining whether or not the on-screen display activation signal is inputted;

(A-3) executing a normal operation routine when the on-screen display activation signal is not inputted; and (A-4) outputting the on-screen display when the on-screen display activation signal is inputted.

3. The method as claimed in claim 2, wherein said step (B) comprises the substeps of:

(B-1) determining whether or not an on-screen display deactivation signal is inputted;

(B-2) erasing the on-screen display when the on-screen display deactivation signal is inputted;

(B-3) determining whether or not the output time of the on-screen display in step (A) exceeds the predetermined first reference time when the on-screen display deactivation signal is not inputted;

(B-4) returning to step (A-4) when the output time of the on-screen display in step (A) does not exceed the predetermined first reference time; and (B-5) erasing temporarily the on-screen display when the output time of the on-screen display in step (A) exceeds the predetermined first reference time.

4. The method as claimed in claim 3, herein said step (E) comprises the substeps of:

(E-1) determining whether or not the on-screen display deactivation signal is inputted;

(E-2) erasing the on-screen display when the on-screen display deactivation signal is inputted;

(E-3) determining whether or not an output time of the on-screen display in step (D) exceeds the predetermined third reference time when the on-screen display deactivation signal is not inputted;

(E-4) returning to step (D) when the output time of the on-screen display in step (D) does not exceed the predetermined third reference time; and (E-5) returning to step (C-5) when the output time of the on-screen display in step (D) exceed the predetermined third reference time.

5. A method for outputting an on-screen display of a display device, said method comprising the steps of:

(A) outputting an on-screen display based on whether or not an on-screen display activation signal, which represents an abnormal state of a display device, is inputted;

(B) erasing temporarily the on-screen display based on whether an output time of the on-screen display in step (A) exceeds a predetermined first reference time;

(C) changing an output position of the on-screen display based on whether or not an erasing time of the on-screen display in step (B) exceeds a predetermined second reference time;

(D) outputting the on-screen display to the output position changed in step (C); and (E) returning to one of step (C) and step (D) based on whether or not an output time of the on-screen display in step (D) exceeds a predetermined third reference time;

wherein the predetermined first reference time is identical to the predetermined third reference time, and the predetermined second reference time is shorter than the predetermined first and third reference times.

6. An apparatus for outputting an on-screen display of a display device, said apparatus comprising:

an on-screen display circuit section for outputting an on-screen display signal in response to an on-screen display output signal and an on-screen output position changing signal, for stopping temporarily the output of the on-screen display signal in response to an on-screen display temporary-erasing signal, and for stopping the output of the on-screen display in response to an on-screen display erasing signal;

a video outputting section for outputting one of a video screen and an on-screen display to the display device in response to a video signal from an outside source and the on-screen display signal from said on-screen display circuit section, respectively; and a control section for monitoring whether or not an on-screen display activation signal which represents an abnormal state of the display device is inputted from the outside source, for supplying the on-screen display output signal to said on-screen display circuit section when the on-screen display activation signal is inputted, for counting an output time of the on-screen display outputted to the display device, for supplying the on-screen display temporary-erasing signal in order to temporarily erase the on-screen display to said on-screen display circuit section based on whether or not the output time of the on-screen display exceeds a predetermined first reference time, for supplying the on-screen display output position changing signal in order to change the output position of the on-screen display to said on-screen display circuit section based on whether or not the output time of the on-screen display exceeds one of a predetermined second reference time and a predetermined third reference time, for monitoring whether or not an on-screen display deactivation signal is inputted, and for supplying the on-screen display erasing signal to said on-screen display circuit section when the on-screen display deactivation signal is inputted;

wherein said control section determines whether or not the on-screen display deactivation signal is inputted, erases the on-screen display when the on-screen display deactivation signal is inputted, determines whether or not a time of temporarily erasing the on-screen display exceeds the predetermined second reference time when the on-screen display deactivation signal is not inputted, repeats determining whether or not the on-screen display deactivation signal is inputted when the time of temporarily erasing the on-screen display does not exceed the predetermined second reference time, and changes the output position of the on-screen display when an erasing time of the on-screen display exceeds the predetermined second reference time.

7. As An apparatus for outputting an on-screen display of a display device, said apparatus comprising:

an on-screen display circuit section for outputting an on-screen display signal in response to an on-screen display output signal and an on-screen output position changing signal, for stopping temporarily the output of the on-screen display signal in response to an on-screen display temporary-erasing signal, and for stopping the output of the on-screen display in response to an on-screen display erasing signal;

a video outputting section for outputting one of a video screen and an on-screen display to the display device in response to a video signal from an outside source and the on-screen display signal from said on-screen display circuit section, respectively; and a control section for monitoring whether or not an on-screen display activation signal which represents an abnormal state of the display device is inputted from the outside source, for supplying the on-screen display output signal to said on-screen display circuit section when the on-screen display activation signal is inputted, for counting an output time of the on-screen display outputted to the display device, for supplying the on-screen display temporary-erasing signal in order to temporarily erase the on-screen display to said on-screen display circuit section based on whether or not the output time of the on-screen display exceeds a predetermined first reference time, for supplying the on-screen display output position changing signal in order to change the output position of the on-screen display to said on-screen display circuit section based on whether or not the output time of the on-screen display exceeds one of a predetermined second reference time and a predetermined third reference time, for monitoring whether or not an on-screen display deactivation signal is inputted, and for supplying the on-screen display erasing signal to said on-screen display circuit section when the on-screen display deactivation signal is inputted;

wherein the predetermined first reference time is identical to the predetermined third reference time, and the predetermined second reference time is shorter than the predetermined first and third reference times.

* * * * *